United States Patent
Lipchock et al.

(10) Patent No.: US 6,173,051 B1
(45) Date of Patent: Jan. 9, 2001

(54) CUSTOM ROUTING FOR MULTIPLE CARRIER INTERCONNECTION

(75) Inventors: Michael J. Lipchock, Ijamsville, MD (US); Robert P. Florindi, Springfield, NJ (US)

(73) Assignee: Bell Atlantic Network Services, Inc., Arlington, VA (US)

( * ) Notice: Under 35 U.S.C. 154(b), the term of this patent shall be extended for 0 days.

(21) Appl. No.: 08/753,153

(22) Filed: Nov. 21, 1996

(51) Int. Cl.$^7$ .................................................... H04M 3/00
(52) U.S. Cl. ............................ 379/220; 379/260; 379/221
(58) Field of Search ...................... 379/207, 220, 379/221, 201, 213, 243, 246, 260, 296

(56) References Cited

U.S. PATENT DOCUMENTS

| | | |
|---|---|---|
| 4,565,903 | 1/1986 | Riley . |
| 5,311,572 | 5/1994 | Friedes et al. . |
| 5,333,184 | 7/1994 | Doherty et al. ........................ 379/115 |
| 5,473,681 | 12/1995 | Partridge ............................... 379/229 |
| 5,475,749 | 12/1995 | Akinpelu et al. ...................... 379/221 |
| 5,479,495 | 12/1995 | Blumhardt ............................ 379/207 |
| 5,517,562 | 5/1996 | McConnell ............................ 379/207 |
| 5,524,146 | * 6/1996 | Morrisey et al. ...................... 379/207 |
| 5,550,911 | 8/1996 | Bhagat et al. . |
| 5,550,912 | 8/1996 | Akinpelu et al. ...................... 379/221 |
| 5,574,783 | * 11/1996 | Dunn ..................................... 379/221 |
| 5,661,792 | * 8/1997 | Akinpelu et al. ...................... 379/221 |

* cited by examiner

Primary Examiner—Ahmad F. Matar
(74) Attorney, Agent, or Firm—McDermott, Will & Emery

(57) ABSTRACT

A system and method of customized routing in the interconnection of multiple public switched telecommunications networks for both unbundled switching and for resale. The arrangement utilizes a hybrid combination of an Advanced Intelligent Network (AIN), line class codes (LCC), and an adjunct processor to provide customized routing for both unbundled switching and for resale while coping with the varied capabilities and capacities of the switches found in the average public switched telephone network. The primary applications are for unbundlers and resellers to have operator (0+, 0-) calls and directory assistance calls (411/555) routed to their own platforms. The arrangement provides a solution to achievement of relatively rapid implementation in an efficient and economical manner with a minimum of modification to existing plant.

26 Claims, 7 Drawing Sheets

|  | 5ESS | DMS-100 | EWSD | 1AESS | DMS-10 |
|---|---|---|---|---|---|
| 0- | OHD ex. Centrex who use LCC | OHD w/ optional Adjunct Proc. for branding | OHD w/ optional Adjunct Proc. for branding | OHD w/ escape code Adjunct Processor | Adjunct Processor |
| 0+ Local | OHD w/ Adjunct Processor | OHD w/ Adjunct Processor | OHD w/ Adjunct Processor | OHD w/ Adjunct Processor | Adjunct Processor |
| 411 | OHD | OHD | OHD | OHD | Adjunct Processor |
| 555-1212 | OHD | OHD | OHD | OHD | Adjunct Processor |
| 7-Digit Local | LEC | LEC | LEC | LEC | LEC |
| 10-Digit Local | LEC | LEC | LEC | LEC | LEC |

Figure 7

CUSTOM ROUTING FOR MULTIPLE CARRIER INTERCONNECTION

TECHNICAL FIELD

This invention relates to the implementation of customized routing in the interconnection of public switched telecommunications networks and more particularly relates to the provision of such routing for both unbundled switching and resale.

ACRONYMS

The written description uses a large number of acronyms to refer to various services, messages and system components. Although generally known, use of several of these acronyms is not strictly standardized in the art. For purposes of this discussion, acronyms therefore will be defined as follows:

Action Control Point (ACP)
Advanced Intelligent Network (AIN)
Area Code (NPA)
Automated Message Accounting (AMA)
Automated Number Identification (ANI)
Central Office (CO)
Competing Local Exchange Carrier (CLEC)
Common Channel Signaling (CCS)
Dual Tone Multifrequency (DTMF)
End Office (EO)
Handoff Switch (HSW)
Integrated Services Digital Network (ISDN)
Integrated Service Control Point (ISCP)
Intelligent Network (IN)
Interexchange Carrier (IXC)
Line Class Codes (LCCs)
Local Access and Transport Area (LATA)
Local Exchange Carrier (LEC)
Off-Hook Delay (OHD)
Office Code (OC or NXX)
Operator Services Position System (OSPS)
Operator Services Signaling (OSS)
Originating Switch (OSW)
Primary Interexchange Carrier (PIC)
Point in Routing (PIR)
Point of Presence (POP)
Private Branch Exchange (PBX)
Service Creation Environment (SCE)
Service Control Point (SCP)
Service Switching Point (SSP)
Signal Switching Point (SSP)
Signal Transfer Point (STP)
Signal Control Point (SCP)
Signaling Point (SP)
Signaling System 7 (SS7)
Signaling Switching Point (SSP)
Signaling Transfer Point (STP)
Traffic Operator Position System (TOPS)
Traffic Service Position System (TSPS)
Transaction Capabilities Applications Part (TCAP)

BACKGROUND OF THE INVENTION

Recent legislative and regulatory changes require that a local exchange carrier (LEC) unbundle certain network elements and services and offer use of those elements and services to other carriers for resale to end users. In one required implementation the LEC will sell the other carrier an unbundled port on an end office switch and allow the other carrier to become a competing local exchange carrier (CLEC) by reselling services of the switch to end users having local loops which connect to the end office switch. Those statutory and regulatory changes also specify that customized routing is required for both unbundled switching and for resale. Customized routing is the term used in the regulations for routing calls made in the local exchange carrier (LEC) switch to locations other than those that exist today. The primary applications are for unbundlers and resellers to have operator (0+, 0-) calls and directory assistance calls (411/555) routed to their own platforms. Other types of calls could possibly be applicable as well, but the 0+/0-/411 calls are the ones in most immediate demand.

This type of customized routing in an interconnection environment represents a capability that currently does not exist in the network architecture of LECs. The currently used switches in the LEC public switched telephone networks were not designed with this functionality in mind. The capability does not exist and the switches are not readily adaptable to provide customized routing. This applies to all of the predominantly deployed switches (5ESS, 1AESS, EWSD, and DMS-100) from three major switch manufacturers, Lucent Technologies (formerly AT&T), Nortel, and Siemens.

One prospective unbundler and reseller has suggested use of line class codes (LCCs) to accomplish this purpose. However, any implementation of customized routing using LCCs would require use of an excessive number of such codes and would produce other serious problems. Not only is there a limit to the capacity of the switch regarding the number of LCCs that could be physically provisioned, managing the new operational environment is at least as critical. The provisioning and maintenance systems that support the LEC's services cannot be ignored. These systems allow telephone services to be ordered, provisioned, monitored, repaired, and billed; they are an essential element in contributing to the quality of service enjoyed today by the public LEC's customers.

Without incorporating new LCCs into the operations systems that support services, severe problems would have to be expected in provisioning services. Manual provisioning would require human intervention and complex lookups that involve locating the correct code in a table of thousands. Such a process would be prone to both error and delay resulting in service degradation. It is for this reason that today's process is mechanized. In an environment with considerably more codes, a mechanized process would be even more important.

The line class code approach would use existing switch resources in a manner that was never intended. Such an application is untested and to some degree would have unknown consequences if deployed on any meaningful scale. Even the proponent of this approach has indicated that LCCs would be an interim and limited workaround which would need to be reversed once a longer term solution could be developed.

Another proposal for coping with the problem has been the possible use of an Advanced Intelligent Network (AIN) common channel signaling (CCS) solution. However, this is not feasible in view of the fact that, while the AT&T 1AESS switch has AIN capability, it will not apply AIN type processing to 0 calls. In that switch, the 0 number routing functionality takes precedence over all other types of call processing, including AIN processing.

The patent literature suggests various approaches to more or less analogous problems.

U.S. Pat. No. 5,550,912, issued Aug. 27, 1996 to Akinpelu et al., and U.S. Pat. No. 5,475,749, issued Dec. 12, 1995 to Akinpelu et al., assigned to AT&T Corporation, disclose specialized call processing in an interexchange carrier (IXC) network to route calls via a LEC and a CLEC or competing local exchange carrier (termed a 'competing access provider' or 'CAP' in these patents).

In one aspect of the Akinpelu et al. call processing, the switch of the IXC network serving as the egress point for a call, checks the area code (NPA) and office code (OC or NXX) of the dialed number to determine if 'exception' routing is necessary, i.e., to determine if the destination station lies in a region served by a LEC and one or more CLECs. If no exception routing is necessary (LEC only), the egress switch routes the call through the LEC carrier switch in the normal manner. However, if exception routing is necessary, the egress switch checks the last four digits of the called number against an exception table to determine if the particular number is served through a CLEC switch or a LEC switch. The table look up can utilize translation tables in the egress switch or tables in a remote database. If the last four digits from the dialed number are listed in the exception table, then the egress switch routes the call through the CLEC's switch. If the last four digits from the dialed number are not listed in the exception table, then the egress switch routes the call through the LEC's switch. If the called customer receives service from both a CLEC and a LEC, the egress switch will route the call through the CLEC switch unless all trunks between the IXC egress switch and the CLEC switch are busy, in which case the egress switch routes the call via the LEC switch.

The Akinpelu et al. Patents also disclose a specialized translation and routing process at the ingress switch of the IXC network. In some cases, a different egress switch serves a CLEC than serves a LEC. For such a case, the ingress switch queries a database. The database identifies the called customer's preferred local exchange carrier and possibly an alternate carrier. Based on the local carrier identification (LEC or CLEC), the ingress switch routes the call through the appropriate egress switch. Data identifying the IXC egress switch, the preferred and alternate carriers and the identity of the terminating switches of the preferred and alternate carriers are transmitted via CCS messages to the egress switch, to eliminate the need for further translation by the egress switch.

U.S. Pat. No. 5,473,681, issued Dec. 5, 1995 to B. Waring Partridge, III, assigned to AT&T Corporation, relates to processing of telephone calls through two or more carriers. Such calls may involve a local exchange carrier and an interexchange carrier, a wireless carrier and a local carrier, or any combination of multiple local exchange carriers and interexchange carriers. In a mobile telephone call, for example, a wireless carrier may route the call through an interexchange carrier to a distant local exchange carrier to complete the call.

A second carrier is preselected as a default primary interexchange carrier (PIC). However, the caller also may select the second carrier on a per call basis by dialing an interexchange access code.

Partridge, III teaches that, for each call in which a telecommunications carrier code specifying a particular carrier is supplied by a caller, the network of the local service provider routing such a call transmits to the selected IXC carrier network an indication that the carrier code was dialed by the caller. The local service provider network may also transmit an indication, if applicable, that the entered carrier code is not the default carrier code. The local service provider network transmits these indications regarding second carrier selection as SS7 messages or portions thereof. The second or interexchange carrier may use the carrier selection indications, for example, to control provision of certain special services on the respective calls.

U.S. Pat. No. 5,333,184, issued Jul. 26, 1994 to Doherty et al., assigned to AT&T Bell Laboratories, discloses a system for recording the 'primary interexchange carrier' identification for the called party. The interexchange carrier typically processes calls from calling parties who have PIC'd that carrier for their long distance services. By recording the PIC of the called party as well, the interexchange carrier can offer special billing treatments for calls from one subscriber to any other one of that carrier's own subscribers.

In the network illustrated in FIG. 1, subscribers 11, 12 obtain local switched telephone service from a local exchange carrier (LEC) network 20. The LEC network 20 includes a number of local switching offices 21, 22. When a subscriber for example at station 11 dials a long distance call, the serving switching office 21 recognizes that the call is a long distance call based on the area code digits. A global PIC database 26 stores PICs for all subscribers serviced through the LEC network 20. In the example, in response to the long distance call from station 11, the switch 21 accesses the global PIC database 26 to identify the primary interexchange carrier selected by or for the particular calling subscriber.

Using the PIC identification from the global database 26, the serving switching office 21 routes the long distance call to the originating switch of the selected interexchange carrier, in the disclosed example, to the originating switch 301 of the interexchange carrier network 30. The interexchange carrier network 30 routes the call to a terminating switch 302.

The called party is served by a LEC network 40, similar to the LEC network 20. In the disclosed example, Doherty et al. assumed that the called party was located at station 51. The terminating interexchange carrier switch 302 therefore routes the call through the switch 41 of the LEC network 40, and the switch 41 completes the call to the station 51.

At call completion, the originating interexchange carrier switch 301 generates an AMA record of the call. A message accumulator system 311 or 312 periodically polls the switches, including the switch 301, to obtain the various AMA records recorded by the switches. Each message accumulator periodically sends the accumulated AMA records to EMI formatting systems 321, 322 for translation into standard "exchange message interface" record format. The EMI formatting systems 321, 322 in turn forward the EMI records to rating systems 331, 332 to compute the toll charges or 'rate' each call.

In addition to the normal rating of calls, the rating systems 331, 332 also access one of the interexchange carrier (IXC) PIC databases 351, 352. The databases 351, 352 indicate whether the called party has the PIC'd the same interexchange carrier. For example, the databases may list telephone numbers for all subscribers PIC'd to the carrier 30. If the called party telephone number is present in the database 351 or 352, then the called party is in fact a customer of the carrier 30. The rating systems 331, 332 use the databases 351, 352 to determine if the called party is a customer of the present interexchange carrier and add a called party PIC indicator to the EMI record for the call. The indicator at least signifies whether or not the called party has PIC'd this interexchange carrier.

U.S. Pat. No. 5,311,572, issued May 10, 1994 to Albert Friedes and Om P. Mahajan, assigned to AT&T Bell Laboratories, discloses a system for processing a database-queried call using the call processing capabilities of a carrier's database as well as a subscriber's database. The carrier's database is a routing database. The subscriber's database contains prestored programs and calling party identification related information including background of the caller.

FIG. 1 depicts the architecture of the system. As shown, a station set 105 connects to a Local Exchange Carrier (LEC) telephone network 103 that includes a communication switching system. The LEC network 103 in turn connects to the Action Control Point (ACP) 102 of an Interexchange Carrier's network. The ACP 102 operates as the point of entry for all LEC traffic for switching through the Interexchange Carrier Network 124. The ACP 102 also serves as the access point to a Common Channel Signaling Network for data based queried telephone calls. The carrier's database 106 connects to the STP (Signal Transfer Point) 104 of the Common Channel Signaling Network.

Carrier database 106 is a computer system with mass storage that receives originating information regarding the call from ACP 102 via STP 104. Various carrier switches are also depicted, such as toll switches 110, 111 and 112, and LEC switch 121. These switches are software-driven processor controlled telephone systems designed to route calls either from one switch to another or to subscriber premises equipment, such as PBX 115 and PBX 116. Status Data Network 130 is connected to PBX'S 115 and 116 and subscriber's database 108.

The originating switch forwards origination information, such as ANI, dialed number and caller entered information, through the ACP 102 and the signaling network to the carrier's database 106. The database 106 in turn sends the information to the subscriber's database 108, via the status data network 130. The subscriber's database 108 uses prestored programs and caller related information to formulate a processing label for the call. The processing label includes a routing label to select a destination number for the call and an end point label which includes information to be passed to the subscriber's premise equipment. A billing information label is also provided. The subscriber's database 108 transmits the processing label back to carrier's database 106, and the database 106 returns appropriate instructions to the ACP 102 to control further processing of the call and routing thereof to the subscriber's station equipment.

U.S. Pat. No. 4,565,903, issued Jan. 21, 1986 to Douglas H. Riley, assigned to AT&T Bell Laboratories, relates to call routing in a multi-carrier environment, in particular to the selection of an interexchange carrier and the routing of a call to the selected carrier.

A subscriber is allowed to presubscribe any carrier by having information identifying that carrier entered in a memory associated with the subscriber's terminal link. The subscriber can then have interexchange calls routed to that carrier without taking any additional steps to select or specify the carrier. The subscriber can select any available carrier on a per-call basis by transmitting, e.g., dialing, signals identifying the desired carrier. Thus, a subscriber may prefer one carrier for certain calls and another for other calls. A caller can complete interexchange calls without having to select a carrier by identifying in a second memory a default carrier for calls for which no carrier is specified.

A carrier for an originating terminal link's telephone call is selected by examining dialing signals or the like received over the terminal link to determine whether they include signals identifying a carrier separate from the signals identifying the call destination-identifying. If a carrier cannot be so identified, the contents of a memory associated with the terminal link are examined to determine whether they identify a carrier, typically based on a presubscription to the carrier's services. A second memory can be examined to determine whether they identify a carrier (default) for use when even the memory associated with the terminal link does not identify a carrier. When a carrier cannot be identified, a request is made over the terminal link that a carrier be identified. Once a carrier is identified, the local exchange network attempts to connect the call to that carrier.

U.S. Pat. No. 5,517,562, issued May 14, 1996 to Von K. McConnell, assigned to Independent Telecommunications Network, Inc. of Overland Park, Kans., discloses an intelligent network type system utilizing the networks of independent telephone companies and other telecommunication service providers to offer centralized, custom subscriber services. McConnell provides a centralized network Service Control Point (SCP) and an associated Service Creation Environment (SCE). Individual service providers have service creation terminals of various types, and the SCE terminals are linked to a service creation server. The server also communicates with the network SCE. Participating service providers may each operate a dedicated SCP linked to the network SCP via a high speed data link. Customized services are created via the diverse SCE terminals, and appropriate records are established in one or more of the SCPs to control actual provision of services.

U.S. Pat. No. 5,479,495, issued Dec. 26, 1995 to Mark S. Blumhardt, assigned to U S West Advanced Technologies, Inc., Boulder, Colo., suggests use of an Advanced Intelligent Network (AIN) to automatically access and invoke existing switch-based services, purportedly without requiring the subscriber to take his telephone set off-hook.

As shown in FIG. 1, at least one service node or suitable switch 12 communicates with a plurality of central offices 14 via signaling transfer points (STPs) 15 using the Transaction Capability Application Part (TCAP) protocol. The switch or service node 12 must be operative as the home switch or virtual Service Switching Point (SSP) for subscribers to existing switch-based services. FIG. 1 illustrates the service node 12 as a combination of a Service Control Point (SCP) 16 and a Service Switching Point (SSP) 18. The SSP 18 is the node which actually recognizes the "triggers" used when a subscriber invokes an intelligent network service and then communicates with the SCP to operate the service. The illustrated network is equipped with the O-called-party-busy trigger and leg manipulation functionality of AIN release 1.0.

In operation, the signaling protocol is monitored to detect predetermined triggers and line conditions associated with selected switch-based services. Upon detection of the predetermined triggers and line conditions, a first electrical signal corresponding thereto is generated for receipt by the service node SCP 16. Normal call processing is suspended, and call handling is transferred to the service node. A second electrical signal such as a voice prompt is generated, prompting the subscriber to select the associated switch-based service. If selected, by entry of a DTMF signal or other suitable response, the switch-based service will be automatically invoked. It is not clear how the subscriber hears the prompt and enters the DTMF selection signal without the subscriber's telephone set being off-hook.

U.S. Pat. No. 5,550,911, issued Aug. 27, 1996 to Bhagat et al., assigned to Lucent Technologies Inc., which is the telecommunications equipment company recently spun off from AT&T, discloses call processing techniques for routing calls to an adjunct processor. The adjunct may connect to an originating switch (OSW), or the OSW may access a remote adjunct through a handoff switch (HSW) when the local adjunct is unavailable. The OSW maintains an automatic number identification (ANI) based trigger table. The OSW compares information relating to an incoming telephone call to the customer's trigger table to determine if the call requires processing via an adjunct. If an adjunct is required, the OSW determines the type of adjunct necessary, identifies an adjunct that is capable of processing the call and routes the call to the identified adjunct.

Once the call reaches the adjunct, the OSW or the HSW transfers information to the adjunct, including the ANI information relating to the particular call. The adjunct stores customer specific applications, and processes the call in accord with one such application selected in response to the call related information from the switch.

The adjunct may operate in a query mode to provide information to the switch without interaction with the caller, or the adjunct may interact with the caller using in-band communications. In the query mode, there is no voice connection to the adjunct. The switch is free to route the call upon completion of the query operation. In the interactive mode, the voice call is completed to the adjunct, so that the adjunct may send voice prompt messages and receive DTMF responses. Upon completion of an interactive operation, the adjunct transmits a release instruction to the switch. The release instruction may include a redirection request for transferring the call to an actual destination.

THE PROBLEM

Recent legislative and regulatory changes set forth the requirements under which competition between public telephony carriers is permissible in both local and long distance markets. It is in the interest of the public and the affected carriers to offer such new services at as early a date as possible. In order that this may be regulatorily feasible it is essential that the above described requirements with respect to customized routing in the interconnection be satisfied in an expeditious manner. It is particularly important that requirements be met in a manner which will provide the mandated service effectively and economically without degradation of the quality of service that the public now receives.

SUMMARY OF THE INVENTION

To satisfy the request for segregated call treatment using existing switch technology, the inventors have developed a Specialized Routing Proposal for CLEC Interconnection. The proposed solution utilizes different unique combinations of AIN processing, line class codes (LCCs) set in the switches, and an adjunct processor. The precise combination of these technologies is varied depending on the type of end office switch.

As part of the requirement for unbundling of switch services and service resale, the Federal Communications Commission (FCC) has mandated customized routing. Specifically, customized routing requires the local exchange carrier to modify the switch functionality to route certain calls from customers of any competing local exchange carrier (CLEC) to a location different from the routing destination for such calls if originated from a LEC customer. Examples of such calls include directory assistance calls (e.g., 411), and 0+, 0− calls.

The switches existing in the network, however, were not designed for such selective alternate routing. For example, existing switches are designed to always route a 411 call from any connected subscriber's line to a port assigned for such calls, typically a port to a traffic operator position system (TOPS). With customized routing, 411 calls from the LEC's customers should still go to the same port, however, the LEC's network must route 411 calls from each CLEC's customers in some alternate manner selected by the CLEC, e.g., to the CLEC's operator system.

The Specialized Routing Proposal for CLEC Interconnection proposed according to the invention utilizes a hybrid solution combining AIN processing, line class codes (LCCs) set in the switches, and an adjunct processor interconnected on a trunk group going to the traffic operator position system (TOPS). The precise combination of these three technologies differs depending on the precise type of end office switch, but all of the specific hybrid solutions utilize certain common principles. With respect to the hybrid solution proposed for the 1AESS type end office switch the invention comprehends the following.

The 1AESS switch has AIN capability, but will not apply AIN type processing to 0 calls. In that switch, the 0 number routing functionality takes precedence over all other types of call processing, including AIN processing.

In a 0+ call, the customer dials a 0 followed by a seven or ten digit destination telephone number. In a 0− call, the customer dials a 0 and then waits for an operator to answer and provide assistance. 0+ ten digit calls which relate to long distance toll calls will be routed using the PIC and 2PIC for the customer's long distance carriers in the current manner. However, currently, all 0+ local calls and all 0− calls go to the LEC operator system. To provide the customized routing for 0 calls through the 1AESS switch according to the invention an adjunct processor or intelligent peripheral is employed on a designated trunk group between the end office switch and the telephone operator position system (TOPS) or equivalent operator system for handling 0+ local calls and 0− calls.

The adjunct processor comprises a small programmable telephone switch with an internal connection to a routing database or translation table. The adjunct processor will receive the dialed digits and the automated number identification information (ANI) identifying the calling customer's line. The processor will utilize the ANI to access the routing database and determine the calling party's local exchange carrier (LEC or one of a plurality of CLECs). If the ANI corresponds to a customer of one CLEC, and that one CLEC accepts the type of call in question (0+ local or 0−), then the processor routes the call over a trunk to the one CLEC's facilities. Another CLEC may elect to have the LEC process the call but demand that the LEC provide a message to the customer identifying the CLEC. In such a case, the processor may 'brand' the call (play the CLEC's chosen announcement message) and then route the call to the LEC's traffic operator position system for further processing. If the caller's ANI is not listed in the database in the adjunct processor, the processor processes the call as one from a customer of the LEC. In such a case, the processor switches the call through to the traffic operator position system for otherwise normal processing by the LEC operator system and associated local telephone network.

Processing of directory assistance calls (411/555) through the 1AESS will utilize AIN processing. For customer's of the CLECs, an off-hook delay trigger is set in the serving end office switch. When the customer takes the telephone off-hook and dials any number, the 1AESS central office launches a query to the ISCP. The query includes the dialed digits and the ANI identifying the calling party's line. The ISCP will store a record for the CLECs' customers indicating the call processing for directory assistance calls (411/555) selected by each carrier.

If the CLEC elects to process the directory assistance calls (411/555), the record in the ISCP will identify a trunk group to the CLEC's network. The ISCP transmits a response back to the end office switch instructing the switch to route the call over the CLEC's directory assistance trunk group. Alternatively, the CLEC may elect to have the LEC process the directory assistance calls, albeit with a CLEC branding message inserted by the LEC. In this alternative call processing, the ISCP returns a response instructing the end office switch to route the call to the LEC network elements processing directory assistance calls (e.g., to a traffic operator position system).

For the CLEC customers, all outgoing calls will hit the off-hook delay trigger and result in a query to the ISCP. If the call is not for directory assistance and the CLEC has not requested some other specialized AIN routing by the LEC, the ISCP returns a response instructing the LEC end office switch to route the call based on the dialed information in the normal manner. This typically results in a default to routing through the LEC's local network.

For the LEC's customers, processing of directory assistance will utilize the switch routing functionality used today to route the calls to the traffic operator position system or the like that handles such calls, in the same manner used on all directory assistance calls today. In particular, there will be no trigger set and no AIN processing of such calls from the LEC's customers.

In other types of switches, such as the AT&T 5ESS, the NorTel DMS-100 and the Siemens EWSD, the switches can apply AIN processing on 0 number calls. In these switches, the AIN processing results in routing of the directory assistance calls (411/555) to the CLEC or to the LEC operator position system as discussed above, and 0– minus calls will be AIN processed and routed to the CLEC or to the LEC operator position system in the same manner. The 0+ calls would go through the adjunct processor for segregation and/or branding as discussed above relative to the 1AESS.

Line class codes are used in certain types of switches to patch or fix problems peculiar to the individual types of switches. For example, in the 5ESS, the switch can not apply an off-hook delay type trigger for AIN processing of calls originating on Centrex lines. For Centrex lines, line class codes (LCCs) are used to define the segregated routing functionality. For example, line class codes define the routing of all 0– calls from Centrex lines to the trunk group going to the adjunct processor. The processor segregates and/or brands such calls, as discussed above. Similarly, the line class codes in the 5ESS instruct the switch to route directory assistance calls from the CLEC's Centrex customers over the designated trunk group to the CLEC's facilities. In its currently deployed configuration, the DMS-100 can not apply off-hook delay triggers to ISDN lines. In that switch, one or more line class codes are used to route 0+ local calls and 0– calls to the adjunct processor and to route directory assistance calls to the CLEC.

It is also a feature of the invention that the network may provide a carrier selection override. To this end an originating trigger may be set in the end office switches for lines to LEC subscribers who desire such over-ride capability. The switch will launch a query to the ISCP when the caller prefixes the service call with some character such as "*". The ISCP then responds with routing directions to the service platform of the caller's choice. In this manner, the LEC's customer's might access a CLEC's 0+ or directory assistance services.

DESCRIPTION OF THE DRAWINGS

FIG. 7 is tabular illustration of the operation of the invention for handling the various types of custom calls with the various involved switches.

DESCRIPTION OF THE INVENTION

Figure 1:
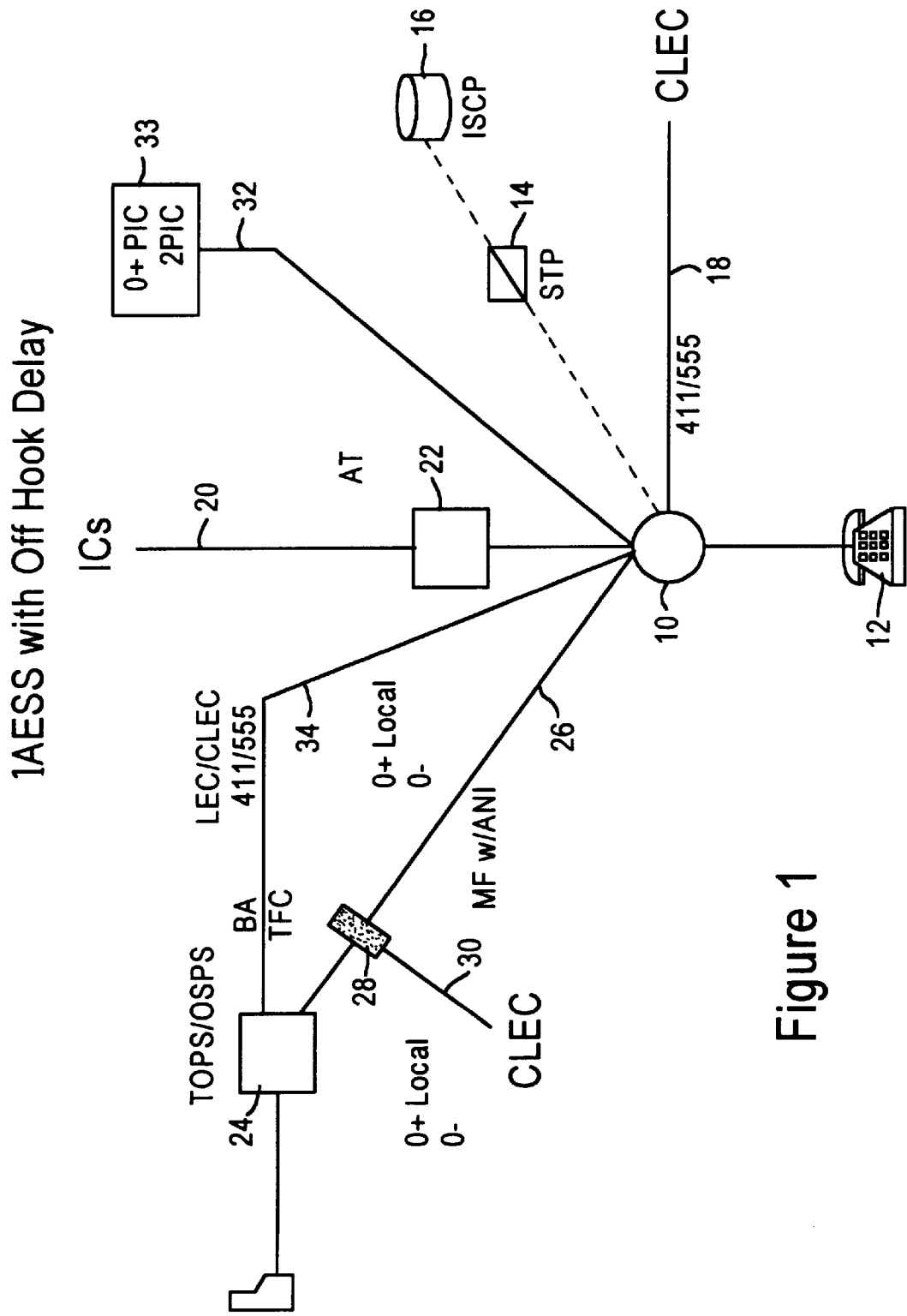
FIG. 1 is a simplified functional block diagram showing the architecture and operation of the system of one embodiment of the invention with respect to AT&T 1AESS switches in a local exchange carrier network providing interconnection with a competing local exchange carrier (CLEC).

Referring to FIG. 1, there is shown at 10 a 1AESS end office (EO) switch or switching system serving subscribers such as the telephone station indicated at 12. The EO switch 10 is part of a local exchange carrier (LEC) network having AIN common channel signaling (CCS) as indicated by the signaling transfer point (STP) 14 and integrated service control point (ISCP) 16. It is assumed that the EO switch 10 has service switching point (SSP) capabilities. The switch 10 is connected to the network of a competing local exchange carrier (CLEC) by a trunk 18. The switch 10 is also connected to an interexchange carrier (IC or IXC), for example, via a trunk 20 and tandem 22. The LEC network which includes the EO switch 10 has a traffic operator position system (TOPS) or operator services position system (OSPS) 24 connected to the switch 10 by a trunk or trunk group 26. An adjunct processor 28 is provided in the trunk 26 and connects to the CLEC network via a group trunk 30. Also connected to the EO switch 10 is a trunk 32 which handles the PIC and 2PIC calls as presently will be explained.

Figure 6:
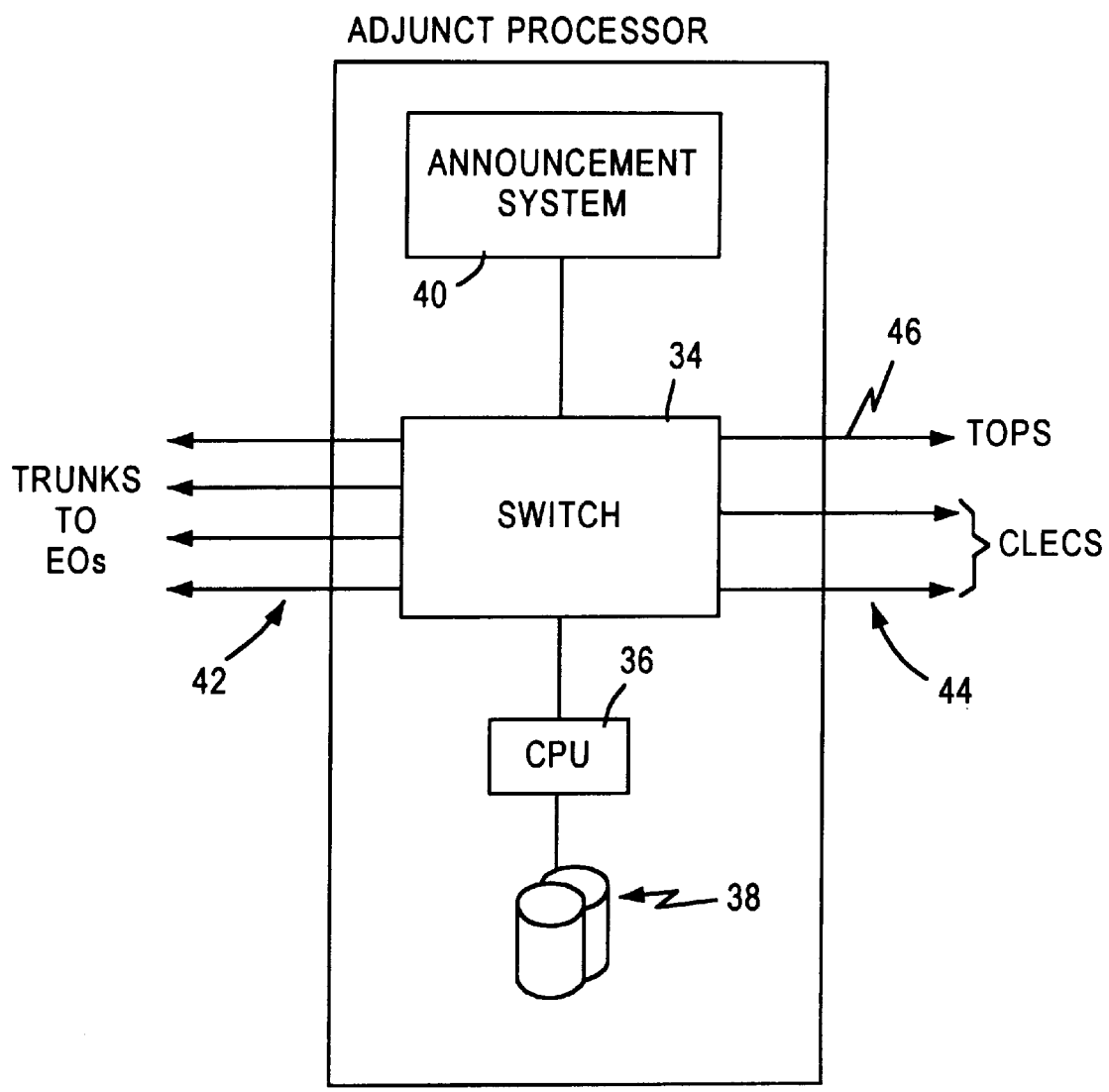
FIG. 6 is a simplified block diagram showing one embodiment of adjunct processor suitable for use in the system of the invention.

Referring to FIG. 6 there is shown a simplified diagram of an adjunct processor suitable for use in the system of the invention. The adjunct processor is shown in FIG. 6 at 28, as in FIGS. 1–4. The adjunct processor comprises a programmable switch and is shown as a switch fabric 34, CPU 36, and routing or translation table databases 38. The adjunct processor includes an announcement system or digital voice platform 40. The switch is connected to the various end offices, such as EO 10 in FIG. 1, by incoming trunks 42, to the CLECs by trunks 44, and to the TOPS or OSPS by trunk 46. The incoming trunks are preferably Feature Group D trunks carrying the ANI in their signaling and typically using operator services signaling (OSS). The adjunct processor may be of the type marketed by Syntellect Network Systems, Inc. as its System/2000, a Telstar Network Switching System and a Nexus Service Control Point sold as a combined system by IEX Corporation, or their equivalents.

Operation is now described in terms of the various switches:

1AESS Switch—AT&T

The 1AESS switch will not apply AIN processing to 0 calls. In that switch, the 0 number routing functionality takes precedence over all other types of call processing, including AIN processing.

The calls which initially are to be processed by the system of the invention consist of the following:

0+ local calls
0– calls
0+ long distance calls
411 directory assistance calls
555-1212 directory assistance calls
7 digit local calls
10 digit local calls Because the nature of the 1AESS switch is such that it will not apply AIN type processing to 0 calls, i.e., it cannot differentiate LEC 0 calls from CLEC 0 calls, a different handling is necessary then would be the case if AIN alone could be relied upon to separate the LEC and CLEC calls. To cope with this problem and to facilitate other functions of specialized routing pursuant to the invention, an off-hook delay trigger is set in all serving end office EO switches for the lines of all customers of CLECs.

When any CLEC customer takes the telephone off-hook and dials any number, the EO or central office switch (including a 1AESS switch) launches a query to the ISCP. The query includes the dialed digits and the ANI identifying the calling party's line. The ISCP will store in its database a record which identifies the CLEC customers and from this database will be able to determine how a 0 call from a particular line should be served, in the instant case, through a 1AESS switch. As a result the ISCP will return a response to the serving 1AESS end office switch instructing it to route the call to the operator system (TOPS or OSPS) used by the LEC via the trunk group 26. The 1AESS switch will accordingly route such calls via trunk 26 toward the TOPS or OSPS 28 used by the LEC.

The adjunct processor 28 will receive the dialed digits and the automatic number identification information (ANI) identifying the calling customer's line. The processor will utilize the ANI to access the CLEC table and determine the calling party's competing local exchange carrier (CLEC) or default to the LEC. If the ANI corresponds to a customer of a CLEC, and that CLEC's translation shows that it accepts the type of call in question (0+ local or 0–), then the processor will route the call over a trunk group, such as the trunk group 30, to that CLEC's facilities. It will be understood that while one trunk is illustrated there will be sufficient CLEC ports on the adjunct and sufficient trunk group capacity to handle the number of CLECs requiring service.

Another CLEC may elect to have the LEC process the call in the same TOPS/OSPS which handles its own calls, but may require that the LEC deliver a message to the customer identifying the CLEC. In such a case, the adjunct processor can use its announcement system to 'brand' the call (play the chosen announcement message of the CLEC), and then route the call to the traffic operator position system 24 used by the LEC for further processing. If the caller's ANI is not listed in the database in the adjunct processor, indicating that it is a LEC customer, the processor processes the call as a call from a customer of the LEC. In such a case, the processor switches the call through to the traffic operator position system 24 for otherwise normal processing by the LEC operator system and associated local telephone network.

1+ ten digit inter LATA long distance calls will be routed using the primary interexchange carrier PIC methodology currently in use for the customer's long distance carriers based on existing switch translations. These calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position system or TOPS/OSPS. This is shown in FIG. 1 on the trunk group 32 to the TOPS/OSPS 33.

Directory assistance calls (411/555-1212) are capable of being handled by the version (0.0) of AIN which is available in 1AESS switches. These calls encounter the off-hook delay (OHD) trigger in the serving switch EO or central office switch (including a 1AESS switch) and that switch launches a query to the ISCP. The query includes the dialed digits and the ANI identifying the calling party's line. The ISCP will store in its database a record which identifies the CLECs and the CLEC's customers. From this database the ISCP will be able to determine that a 411/555 call from a line belongs to a particular CLEC and that such a call should be routed in the manner directed by that CLEC.

According to one option which may be provided to the CLECs, the off-hook delay and ISCP look up may result in a TCAP response to the serving EO switch to route CLEC 411/555 calls direct to a trunk designated by the particular CLEC for that purpose. Thus, if a CLEC such as CLEC-1 so chooses, 411/555 calls identified in the ISCP as being CLEC-1 calls, may be directed pursuant to its ISCP database tables to a trunk group shown as 18. The trunk group 18 may deliver such calls to a central CLEC switch or to whatever handling in the CLEC network that CLEC-1 chooses.

Another option to the CLECs would be to have their 411/555 calls routed by the EO switch pursuant to instructions from the ISCP to the same direct trunk or trunk group that the LEC uses to reach the TOPS/OSPS which it employs for 411/555 calls. Such a trunk is shown at 34. It is to be understood that the TOPS/OSPS may be owned and operated by the LEC but also may constitute a third party installation used by the LEC pursuant to contract. If the CLEC chooses to have call branding, the CLEC 411/555 call may be routed via the adjunct processor trunk 26 for handling in the manner just described for 0 calls.

7 digit and 10 digit local calls coming from CLEC lines will hit the off-hook delay trigger in the EO switch to send a query to the ISCP. The response to this query will carry no information other than to let the EO switch route the call according to the dialed numbers. This defaults to the LEC network, i.e., routes autonomously. This is not likely to constitute an objectionable feature in that such calls rarely involve a toll and in effect would be "free" to the CLEC.

In the foregoing specialized routing scenario the current usage of line class codes will be continued. The system thus would involve a hybrid solution using line class codes, AIN, and an adjunct processor to provide the desired results.

EWSD Switch—Siemens

Figure 2:
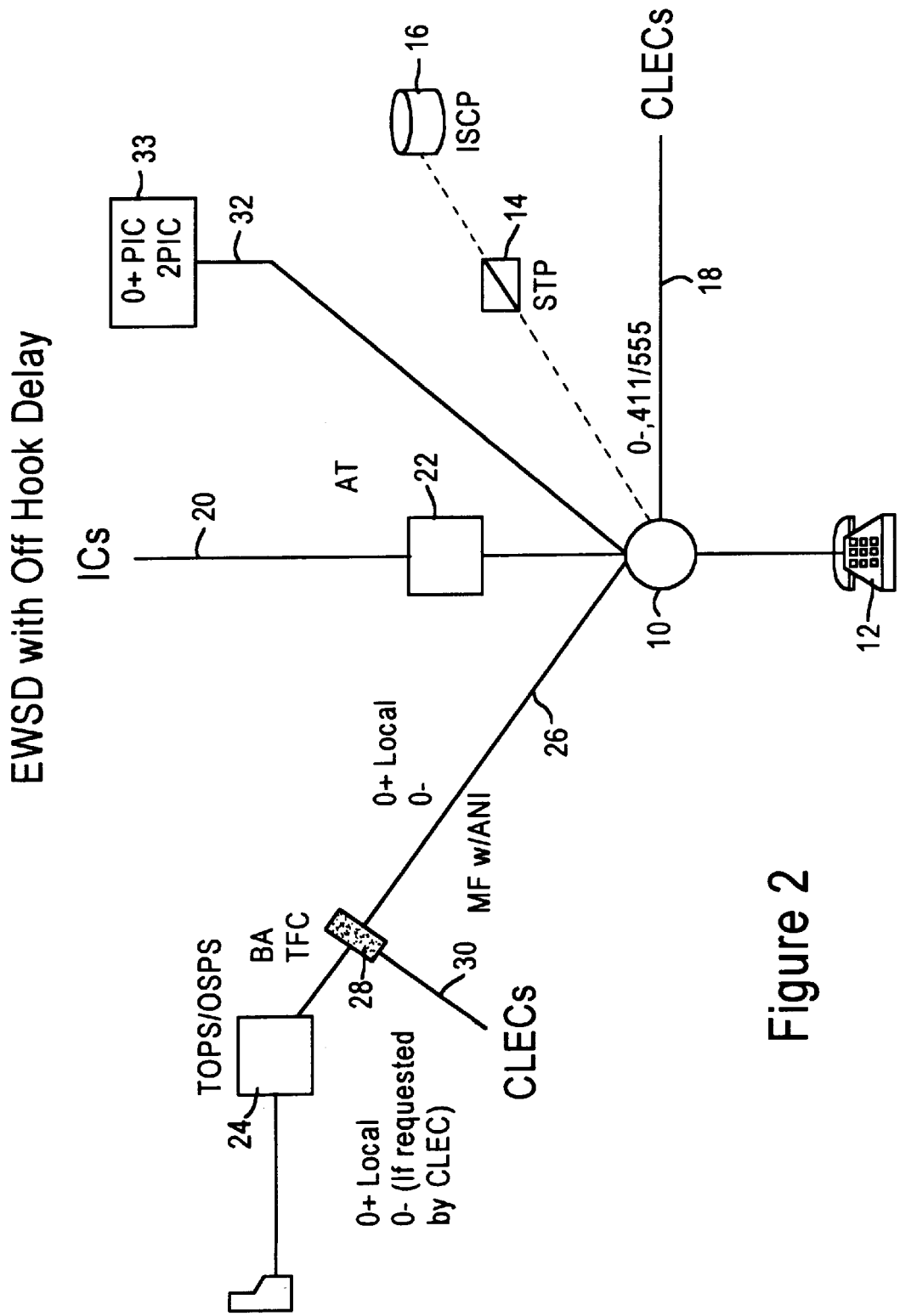
FIG. 2 is a simplified functional block diagram showing the architecture and operation of the system of one embodiment of the invention with respect to Siemens EWSD switches in a local exchange carrier network providing interconnection with a competing local exchange carrier (CLEC).

The AIN capabilities of the EWSD switch permits AIN routing of the 0– calls. As a result 0– calls can be routed directly to the trunk group which may be specified by the CLEC for handling its 411/555 calls. Referring to FIG. 2 it will be seen that the trunk group 18 is designated as handling 0– calls. Thus, as with the 1AESS switch, following the off-hook delay trigger the ISCP will instruct the end office (EO) switch to forward 0– calls directly onto the CLEC trunk group 18, should that be the desire of the CLEC. On the other hand, where the CLEC may choose to have the 0– calls handled by the same TOPS/OSPS that the LEC utilizes, the ISCP may return instructions to forward such calls to the trunk group 26 to adjunct processor 28, where branding may be applied if desired. 0+ local calls would be handled by the adjunct processor and TOPS/OSPS 24 in the manner described above with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 2 as the trunk group 32 to the TOPS/OSPS 33.

411/555 directory assistance calls may be handled under the direction of the ISCP following the off-hook delay trigger to either route the calls to the CLEC trunk group 18 (FIG. 2) or to the LEC trunk group 34 (FIG. 1) as described in connection with the 1AESS switch.

7 digit and 10 digit local calls coming from CLEC lines will again be handled in the same manner as with the 1AESS switch. Thus these calls will hit the off-hook delay trigger in the EO switch to send a query to the ISCP. The response to this query will carry no information other than to let the EO switch route the call according to the dialed numbers. This defaults to the LEC network.

DMS-100 Switch—Northern Telecom

Figure 3:
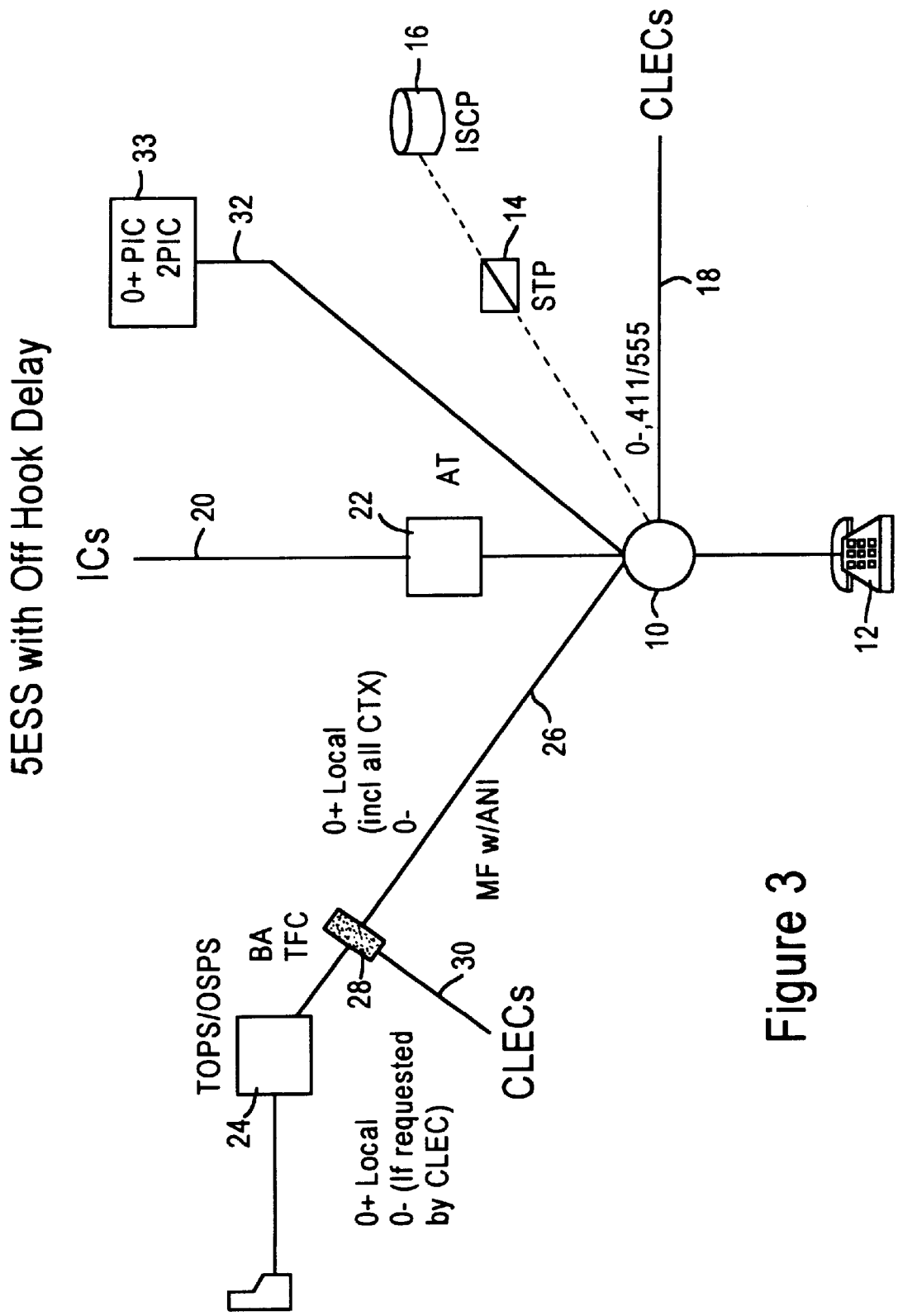
FIG. 3 is a simplified functional block diagram showing the architecture and operation of the system of one embodiment of the invention with respect to AT&T 5ESS switches in a local exchange carrier network providing interconnection with a competing local exchange carrier (CLEC).

0– calls are handled using the AIN functionality. The AIN capabilities of the DMS-100 switch permits AIN routing of the 0– calls. As a result 0– calls can be routed direct to the trunk group which may be specified by the CLEC for handling its 411/555 calls. Referring to FIG. 3 it will be seen that the trunk group 18 is designated as handling 0– calls. Thus, as with the EWSD switch, following the off-hook delay trigger the ISCP will instruct the EO end office switch to forward 0– calls directly onto the CLEC trunk group 18, should that be the desire of the CLEC. On the other hand, where the CLEC may choose to have the 0– calls handled by the same TOPS/OSPS that the LEC utilizes, the ISCP may return instructions to forward such calls to the trunk group 26 to the adjunct processor 28, where branding may be applied if desired. 0+ local calls would be handled by the adjunct processor and TOPS/OSPS 24 in the manner described above with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 3 on the trunk group 32 to the TOPS/OSPS 33.

411/555 directory assistance calls may be handled under the direction of the ISCP following the off-hook delay trigger to either route the calls to the CLEC trunk group 18 (FIG. 3) or to the LEC trunk group 34 (FIG. 1) as described in connection with the 1AESS switch.

7 digit and 10 digit local calls coming from CLEC lines will again be handled in the same manner as with the 1AESS switch. Thus these calls will hit the off-hook delay trigger in the EO switch to send a query to the ISCP. The response to this query will carry no information other than to let the EO switch route the call according to the dialed numbers. This defaults to the LEC network.

5ESS Switch—AT&T

Figure 4:
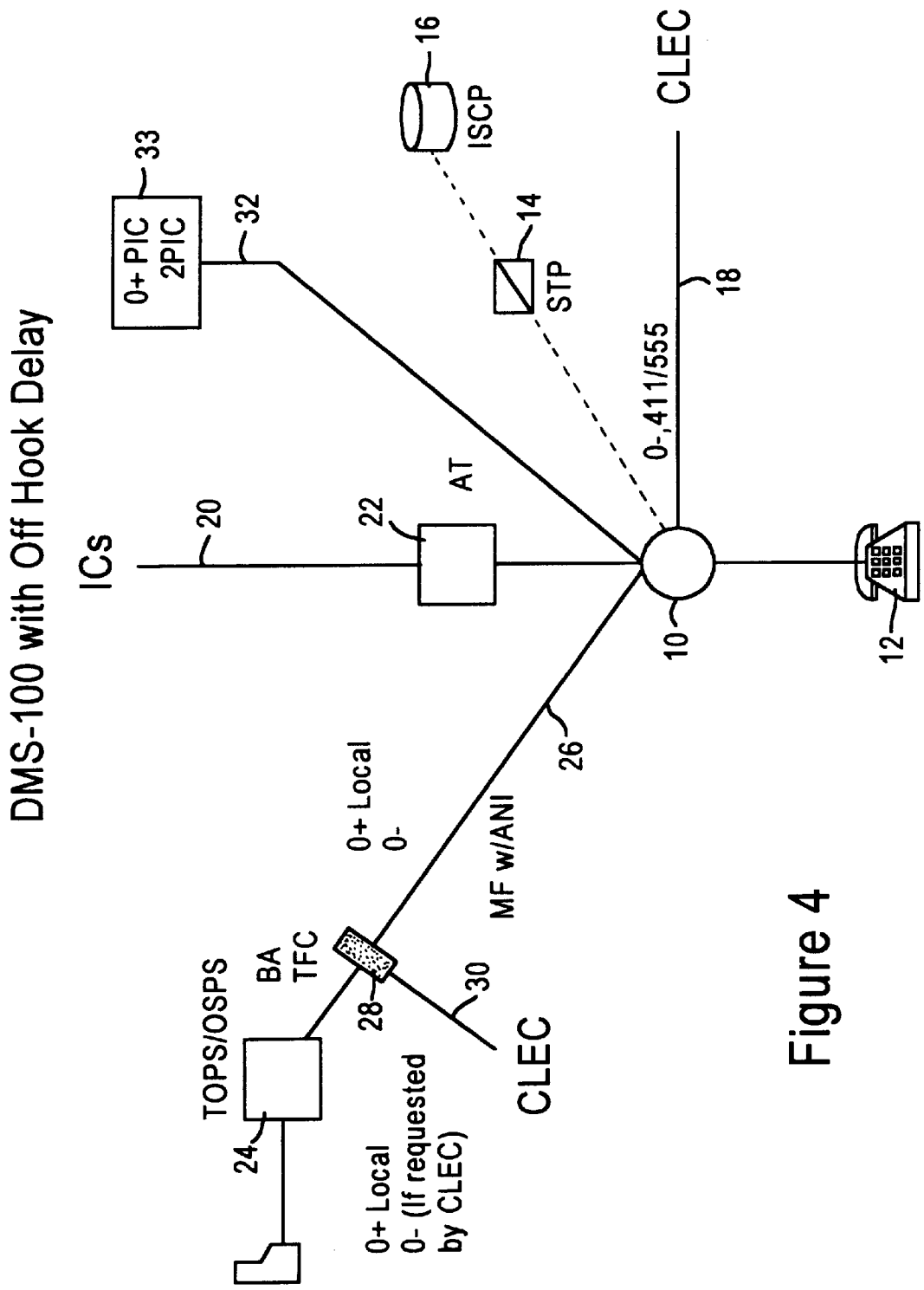
FIG. 4 is a simplified functional block diagram showing the architecture and operation of the system of one embodiment of the invention with respect to NorTel DMS-100 switches in a local exchange carrier network providing interconnection with a competing local exchange carrier (CLEC).

With one significant exception, namely Centrex or PBX calls, 0+ and 0– calls are handled by the 5ESS switch in the same manner as with the EWSD and DMS-100 switches, as just described. 0– calls can be routed directly to the trunk group which may be specified by the CLEC for handling its 411/555 calls. Referring to FIG. 4 it will be seen that the trunk group 18 is designated as handling 0– calls. Thus, as with the EWSD and DMS-100 switches, following the off-hook delay trigger the ISCP will instruct the EO switch to forward 0– calls directly onto the CLEC trunk group 18, should that be the desire of the CLEC. The CLEC may also choose to have the 0– calls handled by the same TOPS/OSPS that the LEC utilizes, the ISCP may return instructions to forward such calls to the trunk group 26 to the adjunct processor 28, where branding may be applied if desired. 0+ local calls would be handled by the adjunct processor and TOPS/OSPS 24 in the manner described above with respect to the 1AESS switch.

With respect to Centrex calls, it is not possible to assign the off-hook delay trigger to Centrex lines. According to the invention, Centrex 0+ and 0– calls all route to the adjunct processor using a line class code (LCC). At the adjunct processor these calls are handled in the same manner as previously described with respect to the 1AESS switch.

1+ ten digit inter LATA long distance calls will be routed using the same primary interexchange carrier PIC methodology described with respect to the 1AESS switch. Thus these calls will be routed over an IXC trunk group 20 and tandem 22 to the proper IXC or IC.

Intra LATA long distance calls will be routed over the same or a similar trunk group (not shown) via the same methodology using the 2PIC translations.

0+ long distance calls will be routed using the same PIC and 2PIC methodology with the exception that the 0+ prefix will cause the call to be routed on an IXC designated trunk to its selected operator position or TOPS/OSPS. This is shown in FIG. 4 on the trunk group 32 to the TOPS/OSPS 33.

411/555 directory assistance calls, other than Centrex or PBX calls, may be handled under the direction of the ISCP following the off-hook delay trigger to either route the calls to the CLEC trunk group 18 (FIG. 4) or to the LEC trunk group 34 (FIG. 1), as described in connection with the 1AESS switch. This is shown in FIG. 4 in relation to the trunk groups 18 and 34 respectively. With respect to Centrex/PBX calls, the AIN cannot be utilized and, according to the invention, these are handled using line class codes. The 411/555 calls are directed in this manner to the adjunct processor. The processor handles these calls in the manner previously described with respect to the 1AESS switch.

7 digit and 10 digit local calls coming from CLEC lines will also be handled in the same manner as with the 1AESS switch. Non-Centrex/PBX calls will hit the off-hook delay trigger in the EO switch to send a query to the ISCP. The response to this query will carry no information other than to let the EO switch route the call according to the dialed numbers. This defaults to the LEC network. Centrex calls default to the LEC network.

DMS-10 Switch—NorTel

Figure 5:
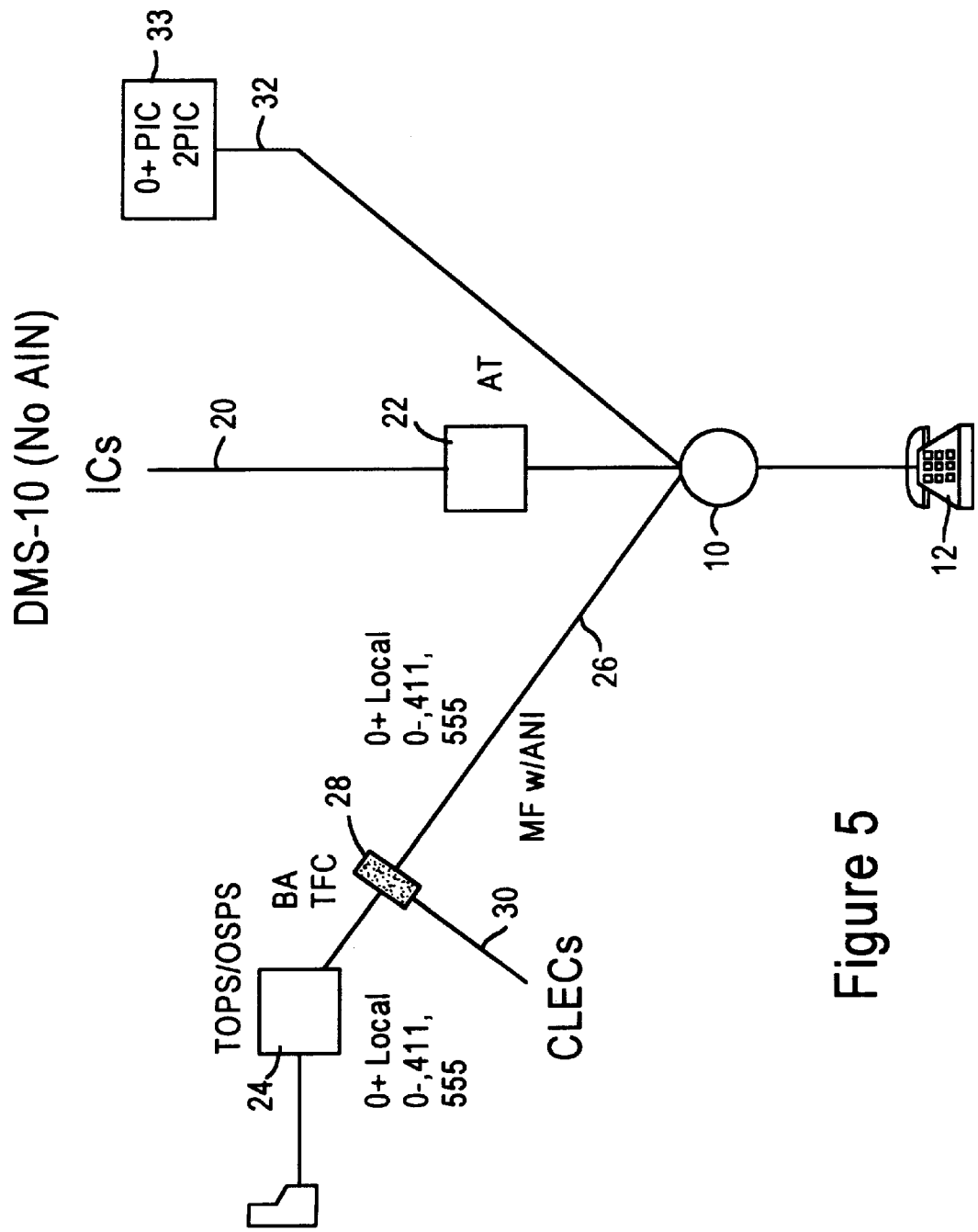
FIG. 5 is a simplified functional block diagram showing the architecture and operation of the system of one embodiment of the invention with respect to NorTel DMS-10 switches in a local exchange carrier network providing interconnection with a competing local exchange carrier (CLEC).

The DMS-10 switch is a relatively small switch in somewhat limited use in a typical LEC network. The switch has Signaling System 7 (SS7) capabilities but is not capable of using AIN. The switch is adapted to the system of the invention by utilizing the adjunct processor for virtually all necessary screening. The arrangement is shown in FIG. 5. The system operates as follows:

The calls that are susceptible to being handled by the PIC and 2PIC methodology are handled in that manner as with the switches previously discussed. Thus, the inter LATA and intra LATA long distance calls are directed by the switch and PIC/2PIC to the trunk groups 20 and 32 in FIG. 5, in the same manner as described with respect to FIGS. 1–4.

All other calls, namely 0+ local, 0–, 411, and 555 calls, are directed by switch translations from the switch 10 to the trunk group 26 and adjunct processor 28. The processor is provided with adequate database tables to perform the desired screening and direct CLEC calls to CLEC facilities via trunk group 30, and to direct LEC calls to the TOPS/OSPS 24.

It will be appreciated from the foregoing that the invention provides a system and method for unbundling LEC facilities and services without requiring large scale use of line class codes. This is accomplished by a hybrid approach that utilizes available facilities and procedures in conjunction with an adjunct professor to achieve the desired result. This is accomplished in an economical and efficient fashion which does not require equipment modification and avoids potential exhaustion of the available supply of line class codes.

As another feature of the invention, provision may be made to permit customer over-ride of the LEC/CLEC selection. For example, it is foreseeable that competing LECs may offer different rates or charges for different custom calling services. A specific example would be a situation wherein an LEC offers to its customers 3 no-charge 411 calls. At the same time a connected CLEC is offering 10 no charge service calls. It is a feature of the invention that an LEC customer desiring to avail his or herself of the larger number of free directory calls may choose to over-ride his or her subscription to the LEC by selecting the CLEC service for one of more specific calls. This may be accomplished according to the invention by providing an additional AIN originating trigger in the end office switches serving LEC customers to whom this flexibility is being offered. An LEC subscriber could avail him/herself of this feature by prefixing a 411 call (or similar custom service call) with the dialing of an "*" or other designated character. The dialing of this call would encounter the trigger and cause a query message to the ISCP. The ISCP would recognize the caller as a LEC customer requesting CLEC service for this call. As a result the ISCP could direct the switch to forward the call to the adjunct processor with addressing instructions that would result in the call being directed to the CLEC's trunk group 30 for purposes of this particular service. The same methodology could be used for other service request calls handled by the adjunct processor.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of routing a call for services from a subscriber of a first carrier over a portion of a switched telephone network of a second carrier which is a local exchange carrier (LEC) having end office switching systems with signal switching point (SSP) capability and an advanced intelligent network (AIN) platform connected to said end office switching systems, said end office switching systems including switches of differing types having differing capabilities, said subscriber being connected to a first of said end office switching systems including a first switch of a first type, said first switch having the capability of routing signals therethrough on the basis of multiple parameters, said method comprising the steps of:

said subscriber dialing one or more characters signifying a request for a first service from a service platform capable of providing said first service;

responsive to said dialed character or characters and predetermined parameters selected from said multiple parameters within the capability of said first switch, routing said request for first service to an adjunct device;

responsive to said request for first service routed to said adjunct device and to a pre-established database in said adjunct device, routing said request for service to a service platform capable of providing said first service.

2. A method according to claim 1 wherein said service platform is an operator service platform.

3. A method according to claim 1 wherein said request for first service is routed to said adjunct device following a query from said first switch to said AIN platform and pursuant to a response from said AIN platform to said first switch.

4. A method according to claim 1 wherein said routing of said request for first service to said service platform capable of providing said first service is via a link from said adjunct device to said service platform.

5. A method according to claim 1 wherein said parameters include the AIN capabilities of said first switch, pre-established primary interexchange carriers (PICs), and line class codes (LCCs).

6. A method according to claim 1 wherein a call for services from a subscriber of a second carrier is automatically routed to a service platform of said second carrier.

7. A method according to claim 6 including the steps of providing means for a subscriber to a second carrier to optionally over-ride said automatic routing to a service platform of said second carrier.

8. A method according to claim 7 wherein said means comprises an originating AIN trigger set in said first switch for the line of said subscriber to said second carrier.

9. A method according to claim 3 wherein said query is initiated responsive to an originating trigger set in said first switch.

10. A method according to claim 9 wherein said originating trigger is an off-hook delay trigger.

11. A method according to claim 10 wherein said off-hook delay trigger is set in said first switch for all subscribers of said first carrier connected to said first switch.

12. A method according to claim 1 wherein said first carrier is an interexchange carrier (IXC) and including the step of routing said first request for first service to a service platform of said IXC based on a primary interexchange carrier (PIC) parameter set in said first switch.

13. A method according to claim 1 including the step of routing said request for first service to a service platform of said first carrier based on a query from said first switch to said AIN platform and pursuant to a response from said AIN platform to said first switch.

14. A method according to claim 1 wherein said first switch has connected thereto a PBX trunk, including the step of routing requests for service on said PBX trunk to said adjunct device on the basis of line class code parameters set in said first switch.

15. A method according to claim 1 including the steps of routing said request for first service to a service platform of said second carrier for requests for service by subscribers of said first carrier and delivering the requested service along with a message identifying said first carrier.

16. A telecommunications system comprising a first local exchange carrier (LEC) network, a second competing local exchange carrier (CLEC) network, and an interexchange carrier (IXC) network, comprising in combination:
   an end office switching system in said LEC network, said end office switching system having signal switching point (SSP) capability and being connected to a plurality of subscriber stations, at least a first of said subscriber stations being a subscriber of said LEC network, and a second of said subscriber stations being a subscriber of said CLEC network;
   an advanced intelligent network (AIN) platform in said LEC network;
   an LEC operator service platform;
   a CLEC operator service platform;
   an IXC operator service platform;
   an adjunct device including a database connected to at said LEC and to said CLEC service platforms;
   said end office switching system having set therein an originating trigger wherein;
   a call for service from said second station activates said trigger and causes said second station to be connected to said adjunct device, said adjunct device determining the identity of said second station and of the carrier network to which said second station subscribes, and if that carrier network is said CLEC carrier network, connecting said second station to said LEC or said CLEC service platform pursuant to said database of said adjunct device,
   a different call for service from one of said first and second stations activates primary interexchange carrier (PIC) switch functionality and pursuant thereto connecting said one of said first and second stations to said IXC service platform.

17. A telecommunications system according to claim 16 including a second competing local exchange carrier (CLEC) network having a second CLEC operator services platform, and wherein a third of said subscriber stations is a subscriber of said second CLEC network, wherein;
   a call for service from said third station activates said trigger and causes said third station to be connected to said second CLEC operator services platform.

18. A telecommunications system according to claim 16 including a PBX connected to said switching system wherein;
   a call for service from said PBX is connected to said adjunct device pursuant to the line class code functionality of said switching system.

19. A method of call routing for a predominate local exchange carrier operating a local exchange advanced intelligent network (AIN) controlled carrier network and one or more competing carriers having interconnection to end office switches, the range of capabilities of said end office switches being varied, said method comprising the steps of:
   a) establishing the capabilities of said end office switches;
   b) using AIN routing to route service calls of competing carriers connected to fully AIN capable end office switches to service platforms of said predominate local exchange carrier or of said competing carriers at the option of said competing carriers;
   c) using a combination of AIN routing and an adjunct switching device to route service calls of competing carriers connected to less than fully AIN capable end office switches to service platforms of competing carriers or to said adjunct switching device, and from said adjunct switching device to service platforms of said predominate local exchange carrier or of said competing carriers at the option of said competing carriers; and
   d) using a combination of AIN routing and an adjunct switching device to route service calls of competing carriers connected to fully AIN capable end office switches to service platforms of competing carriers or to said adjunct switching device, and from said adjunct switching device to service platforms of said predominate local exchange carrier or of said competing carriers at the option of said competing carriers, said routing being determined by operation of said AIN for calls from a first type switching source and by operation of line class codes for calls from a second type switching source.

20. A method according to claim 19 wherein said second type of switching source comprises a Centrex or PBX switching source.

21. A telecommunications system comprising a plurality of carriers, wherein at least a first one of said carriers is a local exchange carrier (LEC) having a network comprising in combination:
   an end office switching system having signal switching point (SSP) capability and being connected to a plurality of stations subscribing to respective different ones of said plurality of carriers;
   an operator service platform; and
   an adjunct processor having connections to said operator service platform and a network of a carrier other than the first one of said carriers;
   wherein said operator service platform is connected to said end office switching system through said adjunct processor; and
   a call for service from a calling station subscriber of a second one of said carriers other than said first carrier connects the calling station to said adjunct processor, said adjunct processor determining the identity of the calling station and of the carrier to which calling station subscribes to identify whether the calling station is to be connected to said operator service platform or a network of the second carrier, and completing the identified connection.

22. A telecommunication system as recited in claim 21, further comprising:

an advanced intelligent network (AIN) platform coupled to said switching system and said end office switching system has set therein an originating trigger, whereby said call for service activates AIN processing to connect said calling station to said adjunct processor.

23. A telecommunication system as recited in claim 21, wherein said network of the second carrier comprises a second service platform connectable to said adjunct processor and said identified connection is made to said second service platform.

24. A telecommunication system as recited in claim 21, wherein said identified connection is made to said operator service platform and the identity of the carrier to which the calling station subscribes is announced to the calling station.

25. A telecommunication system as recited in claim 21, wherein said calling station originates from a PBX having a line calling code whereby said adjunct processor can determine the identity of the PBX second station and of the carrier network to which said second station subscribes.

26. A telecommunication system as recited in claim 21, wherein said adjunct processor comprises a switch for completing the identified connection.

* * * * *

UNITED STATES PATENT AND TRADEMARK OFFICE
CERTIFICATE OF CORRECTION

| | |
|---|---|
| PATENT NO. | : 6,173,051 B1 |
| APPLICATION NO. | : 08/753153 |
| DATED | : January 9, 2001 |
| INVENTOR(S) | : Michael J. Lipchock et al. |

It is certified that error appears in the above-identified patent and that said Letters Patent is hereby corrected as shown below:

Title Page, Item (75) Inventors: should read as follows:

(75) Inventors: Michael J. Lipchock, Ijamsville, MD (US); Robert P. Florindi, Springfield, NJ (US); Frederick J. Richards, Stevensville, MD (US); Charles L. Dunsey, Millersville, MD (US); John A. Morgan, Bethesda, MD (US)

Signed and Sealed this
Fourth Day of June, 2013

Teresa Stanek Rea
*Acting Director of the United States Patent and Trademark Office*